United States Patent
Flather et al.

(10) Patent No.: US 7,771,644 B2
(45) Date of Patent: Aug. 10, 2010

(54) TEXTURED SURFACE COATING FOR GLOVES AND METHOD OF MAKING

(75) Inventors: Michael Flather, Droitwich (GB); Paul Saunders, Redditch (GB)

(73) Assignee: Ansell Healthcare Products LLC, Red Bank, NJ (US)

( * ) Notice: Subject to any disclaimer, the term of this patent is extended or adjusted under 35 U.S.C. 154(b) by 0 days.

(21) Appl. No.: 10/882,016

(22) Filed: Jun. 30, 2004

(65) Prior Publication Data

US 2005/0035493 A1    Feb. 17, 2005

Related U.S. Application Data

(60) Provisional application No. 60/484,602, filed on Jul. 2, 2003.

(51) Int. Cl.
*B28B 1/38* (2006.01)
*A41D 19/00* (2006.01)

(52) U.S. Cl. .............................. 264/307; 264/305; 2/169

(58) Field of Classification Search ................ 428/36.5, 428/36.8, 492, 494, 36.4; 2/161.7, 168, 167, 2/161.1, 161.8, 169; 264/306, 233, 236, 264/305, 307
See application file for complete search history.

(56) References Cited

U.S. PATENT DOCUMENTS

| | | | | |
|---|---|---|---|---|
| 1,719,633 A | * | 7/1929 | Teague | 264/305 |
| 1,993,233 A | * | 3/1935 | Winchester | 264/305 |
| 2,293,928 A | * | 8/1942 | Beal | 428/212 |
| 2,324,735 A | * | 7/1943 | Spanel | 428/36.5 |
| 2,353,877 A | * | 7/1944 | Chollar | 264/49 |
| 2,393,298 A | * | 1/1946 | De Laney et al. | 2/168 |
| 2,434,035 A | | 1/1948 | De Laney et al. | |
| 2,503,139 A | * | 4/1950 | Fabregues-Boixar Soler | 264/49 |
| 2,526,431 A | * | 10/1950 | Strickhouser | 427/302 |
| 2,642,335 A | * | 6/1953 | Ewart et al. | 423/266 |
| 2,867,849 A | | 1/1959 | Drew et al. | |
| 2,873,450 A | | 2/1959 | Brodeur, Jr. | |
| 2,997,746 A | * | 8/1961 | O'Brien et al. | 264/48 |
| 3,869,726 A | * | 3/1975 | Bell | 2/164 |
| 3,934,062 A | * | 1/1976 | Tillotson et al. | 427/185 |
| 4,082,862 A | | 4/1978 | Esemplare et al. | |
| 4,143,109 A | * | 3/1979 | Stockum | 264/112 |

(Continued)

FOREIGN PATENT DOCUMENTS

EP    824896    2/1998

(Continued)

OTHER PUBLICATIONS

Translation of JP 01258917 A, Method for the Formation of Unevenness on the Outermost Layer of Resin, Shigeo Kishi, 1989.*

(Continued)

*Primary Examiner*—Matthew J. Daniels
(74) *Attorney, Agent, or Firm*—Diehl Servilla LLC

(57) ABSTRACT

There is provided, in accordance with the principles of the present invention, a glove having a textured surface or textured foam coating produced by embedding a layer of discrete particles, such as a salt, into a previously formed liquid layer, gelling or curing the layer and dissolving the discrete particles to leave a textured or textured foamed surface.

18 Claims, 2 Drawing Sheets

U.S. PATENT DOCUMENTS

| | | | |
|---|---|---|---|
| 4,218,779 A * | 8/1980 | Hart et al. ............... 2/168 |
| 4,283,244 A | 8/1981 | Hashmi | |
| 4,284,275 A * | 8/1981 | Fletcher ............... 473/549 |
| 4,329,312 A * | 5/1982 | Ganz ............... 264/306 |
| 4,463,156 A * | 7/1984 | McGary et al. ............... 528/65 |
| 4,497,072 A | 2/1985 | Watanabe | |
| 4,519,098 A | 5/1985 | Dunmire et al. | |
| 4,536,890 A | 8/1985 | Barnett et al. | |
| 4,555,813 A * | 12/1985 | Johnson ............... 2/161.8 |
| 4,589,940 A * | 5/1986 | Johnson ............... 156/78 |
| 4,779,290 A | 10/1988 | Welch et al. | |
| 5,070,540 A * | 12/1991 | Bettcher et al. ............... 2/2.5 |
| 5,098,755 A | 3/1992 | Tanquary | |
| 5,284,607 A | 2/1994 | Chen | |
| 5,304,337 A * | 4/1994 | Chen et al. ............... 264/303 |
| 5,438,709 A * | 8/1995 | Green et al. ............... 2/167 |
| 5,500,469 A | 3/1996 | Johnsen et al. | |
| 5,649,326 A | 7/1997 | Richard, Jr. et al. | |
| 5,712,346 A | 1/1998 | Lee | |
| 5,822,791 A * | 10/1998 | Baris ............... 2/2.5 |
| 5,948,707 A | 9/1999 | Crawley et al. | |
| 5,977,223 A | 11/1999 | Ryan et al. | |
| 5,993,923 A * | 11/1999 | Lee ............... 428/36.8 |
| 6,019,922 A | 2/2000 | Hassan et al. | |
| 6,075,081 A | 6/2000 | Nile et al. | |
| 6,081,928 A | 7/2000 | Bourne | |
| 6,254,947 B1 | 7/2001 | Schaller | |
| 6,306,514 B1 | 10/2001 | Weikel et al. | |
| 6,347,409 B1 | 2/2002 | Nile et al. | |
| 6,378,137 B1 | 4/2002 | Hassan et al. | |
| 6,391,409 B1 * | 5/2002 | Yeh et al. ............... 428/35.7 |
| 6,440,498 B2 | 8/2002 | Schaller | |
| 6,526,593 B2 | 3/2003 | Sajovic | |
| 6,527,990 B2 | 3/2003 | Yamashita et al. | |
| 6,675,392 B2 | 1/2004 | Albert | |
| 6,745,403 B2 | 6/2004 | Sajovic | |
| 7,037,579 B2 | 5/2006 | Hassan et al. | |
| 2001/0011387 A1 | 8/2001 | Yamashita et al. | |
| 2001/0053421 A1* | 12/2001 | Schaller ............... 427/557 |
| 2002/0035744 A1 | 3/2002 | Kolcio et al. | |
| 2003/0033660 A1 | 2/2003 | Sajovic | |
| 2003/0037364 A1 | 2/2003 | Albert | |
| 2003/0221239 A1 | 12/2003 | Modha et al. | |
| 2004/0122382 A1 | 6/2004 | Johnson et al. | |
| 2005/0015888 A1 | 1/2005 | Altmann et al. | |
| 2006/0008631 A1 | 1/2006 | Takeyama et al. | |
| 2006/0068140 A1 | 3/2006 | Flather | |
| 2006/0143767 A1 | 7/2006 | Yang et al. | |
| 2008/0199354 A1 | 8/2008 | Gordon | |
| 2009/0053312 A1 | 2/2009 | Berndt | |
| 2009/0061751 A1 | 3/2009 | Polsky | |
| 2009/0077713 A1 | 3/2009 | Saunders et al. | |
| 2009/0105424 A1 | 4/2009 | Kodama | |
| 2009/0158498 A1 | 6/2009 | Singer | |
| 2009/0158499 A1 | 6/2009 | Singer | |
| 2009/0253810 A1 | 10/2009 | Katz | |
| 2009/0255033 A1 | 10/2009 | Chen et al. | |
| 2009/0280470 A1 | 11/2009 | Fare et al. | |
| 2009/0292081 A1 | 11/2009 | Suddaby | |

FOREIGN PATENT DOCUMENTS

| | | | |
|---|---|---|---|
| FR | 2448307 | | 9/1980 |
| GB | 418240 | | 10/1934 |
| JP | S52-027899 | | 3/1977 |
| JP | S52-050902 | | 11/1977 |
| JP | S54-090362 | | 7/1979 |
| JP | S55-163202 | | 12/1980 |
| JP | S58-184512 | | 12/1983 |
| JP | S62-011117 | | 1/1987 |
| JP | S63-051864 | | 10/1988 |
| JP | 01258917 A | * | 10/1989 |
| JP | H6-021364 | | 3/1994 |
| JP | H6-021365 | | 3/1994 |
| JP | 06/238683 | | 8/1994 |
| JP | 2002-20913 | | 1/2002 |
| JP | 2002-249909 | | 9/2002 |
| SU | 711051 | | 1/1980 |
| WO | WO 00/19847 A1 | | 4/2000 |
| WO | WO-02/52965 | | 7/2002 |
| WO | WO 03/102058 A1 | | 12/2003 |

OTHER PUBLICATIONS

"Photograph of Towa Micropore and Ansell Oil Grip", (Undated), 1 pg.
European Search Report dated Feb. 5, 2009 for No. 04756576.7, 4 pp.
Non-Final Office Action in U.S. Appl. No. 12/106,711, (Oct. 8, 2009), 8 pgs.
"International Search Report", PCT/US2005/001002, (Jan. 17, 2006),7 pp.
"IPRP and Written Opinion", PCT/US2005/001002, (Jul. 17, 2007), 9 pgs.
"Non-Final Office Action", U.S. Appl. No. 11/035,366, (Jun. 5, 2007),17 pgs.
"PCT Written Opinion, PCT/US04/21295", (Nov. 24, 2004),9 pgs.
"Non-Final Office Action", U.S. Appl. No. 11/639,017, (Feb. 2, 2010),18 pgs.
"Non-Final Office Action", U.S. Appl. No. 11/706,536, (Feb. 4, 2010),9 pgs.
"Encyclopaedia Chimica 2", *28th impression of reduced edition*, Mar. 15, 1984, *published by Kyoritsu Publishing Co., Ltd.*, p. 840-841.

\* cited by examiner 0.5mm 0.5mm

TEXTURED SURFACE COATING FOR GLOVES AND METHOD OF MAKING

This application claims the benefit of U.S. Provisional Application No. 60/484,602, filed Jul. 2, 2003.

FIELD OF THE INVENTION

The present invention relates to a glove with a textured surface and methods for making the glove.

BACKGROUND OF THE INVENTION

Unsupported gloves are manufactured by dipping glove formers shaped like hands into tanks of liquid latex and admixed chemicals. The latex may contain vulcanization agents that are used to cure the rubber, and a dry rubber film is produced. The formers are first precoated with a coagulant to gel the latex and to facilitate the subsequent removal of the glove from the former. The precoated formers are then dipped in the tanks of chemicals necessary to make the gloves. While still on the formers, the latex gloves also go through one or more rinses to leach out proteins and residual chemicals. The wet gel is dried and cured in a heated oven and the latex glove cures on the former before they are reversed stripped off the former, packaged, and/or sterilized. The inside surface of the stripped glove is smooth whilst the outside surface of the glove takes the impression of the texture from the glove former.

Supported gloves are manufactured by dip coating a supporting liner dressed on a glove former. The inside of the glove can be made of a knit material, a non woven fabric or other suitable material. After drying and curing in a heated oven the glove is removed from the former but not reversed hence a smooth outside surface of the glove results from the latex dip coating process. Alternatively, supported gloves can be made by dip coating the supporting liner with a layer of foamed latex material. Prior art gloves include dip coating with a foamed latex material that is unevenly applied to provide texture, but this surface levels out in the heating and curing process, leaving a closed cellular surface structure with a smooth surface layer.

Smooth layers of latex create problems with the wearer's ability to grip objects, especially when wet. The prior art includes unsupported gloves made using formers having embossed patterns designed to improve the wearer's grip. These patterns create designs on the finished glove product, however, they contribute little to improving grip and are primarily aesthetic. Additionally, the prior art shows that post-processing of the gloves to remove excess surfactants from the latex by washing may marginally improve the wet grip. Alternatively, surface treatment by a halogen, such as chlorine, will not only remove the surfactant but also chemically modifies the latex surface. The surface treatment provides a more chemically resistant surface that retards the rate of chemical absorption and perhaps material degradation, resulting in a marginal improvement in wet grip. In supported gloves, an overcoat of polymeric latex optionally containing rubber or mineral fillers may slightly improve grip. These processes also add to the cost of glove production and may require additional machinery.

In prior art gloves where the smooth latex is on the inside of the glove, the smooth surface is in close contact with the skin and it does not absorb sweat. This creates a clammy feeling on the wearer's hands. The prior art has included cotton flock on the inside of unsupported gloves to aid in sweat absorption, yet flock only absorbs small amounts of sweat.

Foam material with a closed cellular surface layer does little to aid circulation of air inside the glove but can absorb sweat. Also, a foam material on the outside of either unsupported or supported gloves has a closed cellular surface layer that does little to enhance the ability to grip wet or slippery objects.

It is therefore desirable to have a glove with a textured surface coating that is easily produced in the normal course of glove manufacture. A glove of this type would improve grip, such as wet/oil grip, when introduced to the outside of the glove. When included on the inside of the glove a textured surface would increase sweat absorption and reduce the degree of direct skin contact hence reducing the clammy feeling against the skin. It is therefore desirable to have a foam material layer with an open cellular structure with a textured surface.

SUMMARY OF THE INVENTION

There is provided, in accordance with the principles of the present invention, a glove having a textured surface coating produced by embedding a layer of discrete particles, such as a common salt, into a liquid surface of a dipped latex film, gelling or drying the dipped latex layer, dissolving away the discrete particles to leave a textured surface, thereafter leaching, drying and curing and finally removing the glove from the former. In one embodiment, the present invention may provide a textured surface coating on the outside of the glove to improve wet gripping, on the inside of the glove to improve comfort, or both. In another embodiment, the present invention may also provide a textured surface produced by applying a foam material to a woven, knit or other substrate layer, embedding a layer of discrete particles into the liquid foam material layer, processing the foam layer and dissolving the embedded discrete particles. In another embodiment, the present invention further provides a process by which gloves with textured surface coatings or open celled foamed surface coatings may be produced.

DETAILED DESCRIPTION

Figure 1:
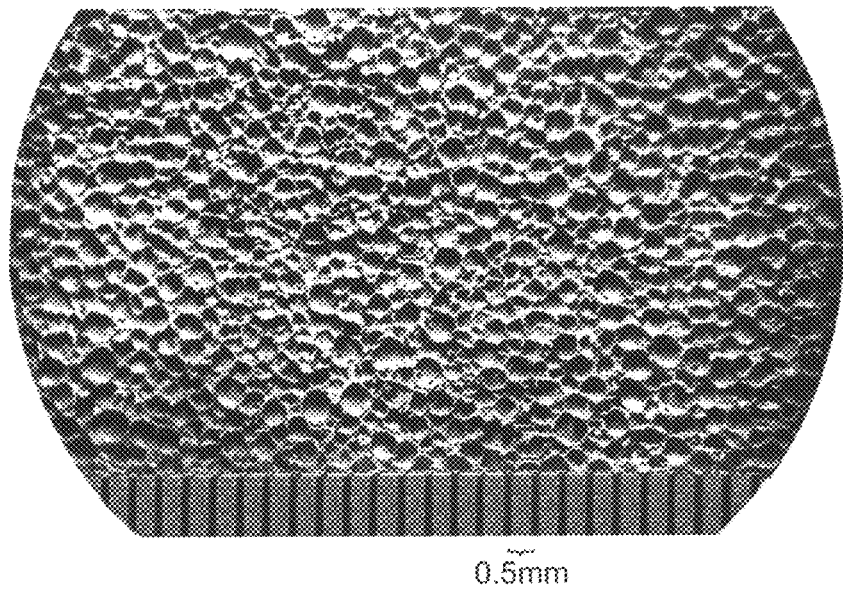
FIG. 1 is a photograph of a plan view of a textured surface coating in a glove made according to one embodiment of the present invention.
Figure 2:
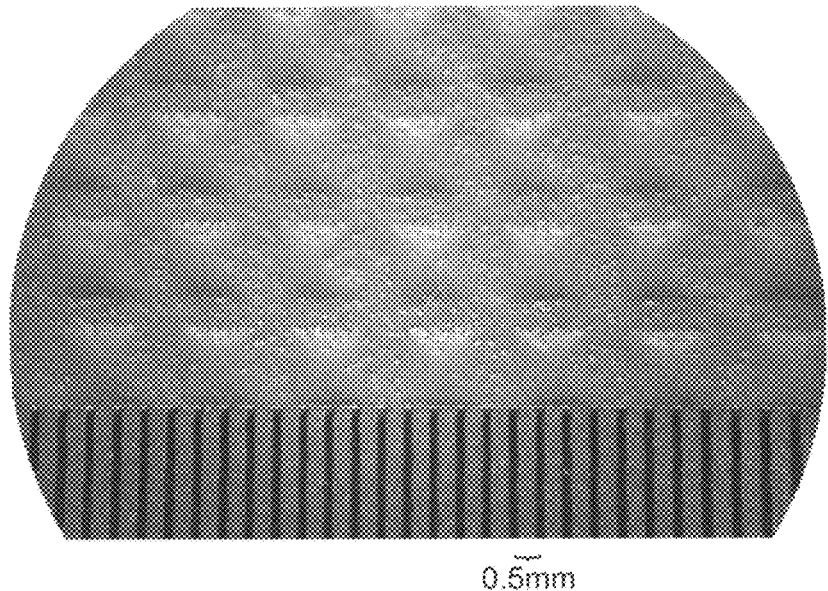
FIG. 2 is a photograph of a plan view of a surface in a SOLVEX 37-676 nitrile glove.

The present invention is directed to a glove with a textured surface coating made from either non foamed latex or foamed latex produced by embedding discrete particles in a layer of ungelled latex. The latex layer is ideally gelled on contact with the discrete particles. The process is completed by drying and curing the glove. The discrete particles may be removed from the layer either after gelling or curing by dissolving the particles in a suitable solvent. This process leaves impressions where the discrete particles were embedded, resulting in a textured surface coating that can improve grip, air circulation within the glove with less direct skin contact and a degree of sweat absorption. For example, wet/oil grip is improved in the textured gloves of the present invention.

Foam material may be used in place of non-foamed latex to produce the textured surface layer, providing better grip, higher sweat absorption and a flexible layer of insulation.

The discrete particles used include, but are not limited to, various salts, including sodium chloride, potassium chloride, calcium chloride, magnesium chloride, zinc chloride, calcium nitrate, zinc nitrate, or other soluble compounds such as sugar (sucrose). A salt that is substantially soluble in a solvent, such as water, is preferred. A preferred salt is sodium chloride. Sodium chloride has several advantages in that it is inexpensive, readily available, easily disposed of and recycled, or reused. One useful commercial preparation of sodium chloride, 99% purity, is available from BSS International Ltd., Peterborough, England. Useful mean particle sizes can range from about 50 microns to about 6000 microns. A preferred mean particle size range is from about 50 microns to about 2000 microns. While all of these salts can be used to provide a similar physical textured appearance, chloride salts provide a distinct improvement in wet/oil grip and chemical resistance of the textured surface of the present invention.

A salt, such as, for example, sodium chloride, upon contact with a liquid latex used in the present invention, immediately destabilises the latex to form a wet gel, and hence "freezes" that shape of the salt particle in the surface of the rubber. When the salt is removed a surface texture is created. This surface texture is the reverse image of the salt particle.

The desired texture will be controlled by the choice of discrete particle. For example, a dendritic salt will produce a multi-faceted impression because it is a many-pointed crystal. Different impression sizes will result from the particles chosen as well. Crushed salt will produce various sizes of impression, while the very fine particles of table salt will produce a dense, more even distribution of small impressions. Mixtures or combinations of particle size can be used. The solvent used to dissolve away the discrete particles will depend on the solubility of the particles, and may be water, an acid or an alkaline compound.

According to embodiments of the present invention, gloves may be manufactured using a variety of different techniques. According to a preferred embodiment, the gloves are produced in a mass production line where a great plurality of gloves is sequentially, rapidly and consistently produced. Such a technique conveys and manipulates multiple glove formers through a series of chemical solutions and process steps to make the glove. The formers are made of porcelain, steel or plastic. According to the standard manufacturing process, gloves may be produced directly on the formers that are conveyed from one station to the next. For example, the formers are dipped into surfactants, waxes, coagulants and natural or synthetic elastomers to obtain a layer of the desired characteristics. The technique allows for altering the composition, the order of application, and the method of application of ingredients that make up the layer of the glove.

The glove may be built up from multiple dips into various substances. For example, the formers may be initially dipped into a composition of a powder free release agent and a coagulant. That release agent and coagulant dip supplies a release material for the subsequent removal of the finished glove from the formers. In addition, the coagulant material will destabilize subsequent liquid layers such as latex type elastomers.

After the release agent/coagulant dip is applied, the formers are preferably conveyed to the next station in the production line where the laminate layer is applied to the formers. The laminate layer may be comprised of a latex elastomeric dip, such as natural or synthetic rubber latex such as polyurethane, nitrile or polychloroprene. For example, various combinations and blends of latices can be used. The latices of the present invention optionally can be foamed. One useful nitrile latex is REVENEX 99G43 (Synthomer Ltd., United Kingdom). By varying the selection and composition of the latex material, the laminate layer may be varied to provide different degrees of strength, comfort, flexibility and chemical resistance. In any event, the content of the latex applied to the former will preferably be adjusted to provide protection from cuts and abrasion, liquid repellency and chemical resistance.

After the application of the laminate layer, a second coagulant dip may be applied if another laminate layer is to be applied. Additional coagulant dip and laminate layers may be added to reach the desired degree of thickness and flexibility. After application of one or more laminate layers, the formers are preferably passed through ovens at elevated temperatures to dry and cure and provide the final product. The gloves are then removed either manually or by an automated technique.

According to the substantially automated mass production technique described above, a great number of variations may be introduced to provide additional or different desired characteristics of the laminate in accordance with the present invention.

In one embodiment of the invention, the former is dipped to form a first layer of latex. This first layer of latex is then gelled and the former is dipped again to form a second layer of ungelled latex. The viscosity of the foamed or non foamed latex latices of the second layer can range from about 100 cps to about 2000 cps (Brookfield). Discrete particles are then applied to the ungelled second layer of latex by dipping the former into a fluidized bed of discrete particles or other mechanical means of embedding the discrete particles, for example, spraying. The fluidized bed process utilises the suspension of salt particles (NaCl) in an air stream such that the particles behave in a manner similar to a liquid. The discrete particles are removed by dissolving with an appropriate solvent after the discrete particles have been applied or after gelling or curing of the glove to leave behind a textured surface coating substantially over the surface of the glove. For example, salt particles can be removed from the gelled surface by washing or spraying with water. Viscosity of the latex is one parameter that can be varied to achieve the desired textured effect. Textured non foamed layers provide the optimum durability and wet/oil grip combination.

In another embodiment of the invention, the former is dipped into more than one layer of latex and gelled after each layer until the desired number of layers is achieved. The former is then dipped once more in latex and discrete particles are applied to this outermost ungelled layer of latex by dipping the former into a fluidized bed of discrete particles or other mechanical means of embedding the discrete particles, for example, spraying. The discrete particles are dissolved with an appropriate solvent after gelling or curing of the glove to leave behind a textured surface coating. Textured non foamed layers provide the optimum durability and wet/oil grip combination.

Figure 3:
FIG. 3 illustrates a cross-sectional view of a two-layer glove made according to an embodiment of the present invention having a textured surface layer as a second layer.
Figure 3:
Figure 4:
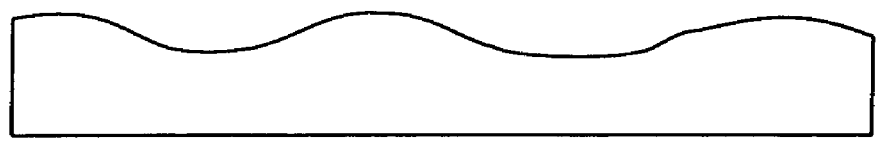
FIG. 4 illustrates a cross-sectional view of a single layer SOLVEX 37-676 nitrile glove.
Figure 4:

In yet another embodiment of the invention, the former is dipped to form a first layer of latex. This first layer of latex is then gelled and the former is dipped a second time in a foamed material to form a second layer. Discrete particles are then applied to the ungelled layer of foamed material by dipping the former into a fluidized bed of discrete particles or other mechanical means, for example, spraying, as shown in FIG. 3. The discrete particles are dissolved with an appropriate solvent after processing of the glove to leave behind a textured surface coating. This process creates a textured surface foam layer coating that retains an open cellular structure because the discrete particles gel the foam and hence capture the cellular structure. Additionally the reverse image of the discrete particles is captured in the surface layer following their removal by an appropriate solvent hence leaving a textured surface layer.

In another embodiment, a single textured layer can be prepared according to the principles of the present invention. That is, no first or laminate layer is prepared prior to the preparation of a second textured layer. In this embodiment, a nonfoamed or foamed layer is applied to a former. Discrete particles are then applied to the ungelled layer of nonfoamed or foamed material by dipping the former into a fluidized bed of discrete particles or other mechanical means, for example, spraying. The discrete particles are dissolved with an appropriate solvent after processing of the glove to leave behind a textured surface layer.

Another embodiment of the invention includes a piece of non-latex material with a textured surface coating produced by embedding discrete particles in the outer layer of the latex overdip. For this embodiment, the former would have a layer of non-latex material applied as a support, for example woven material or cotton flock, and be dipped in a layer of foamed or non foamed latex. An example of a useful woven material is a knitted liner. Discrete particles are then applied to the layer of foam material by dipping the former into a fluidized bed of discrete particles or other mechanical means of embedding the discrete particles, for example, spraying. The piece of material is then gelled or cured and the discrete particles are dissolved with an appropriate solvent to leave behind a textured surface coating. This material may then be cut apart and the pieces sewn to various glove parts to provide an improved grip or absorb sweat. In embodiments of supported gloves, where latex coatings are made onto knitted liners, the first or subsequent latex layers can be subjected to texturing.

For internal linings of an unsupported glove, a substitute for traditional flocking can be made by using the textured surface against the skin. In this case a soft textured surface can be provided by applying the texture to a foamed latex. A soft feel can also be obtained by texturing a non foamed latex, but a softer low acrylonitrile ("AN") polymer as a non foamed latex is preferred. The textured surface of a foamed latex provides sweat absorption by means of the foam structure as well as providing a low surface contact area to the skin. Air circulation is enhanced, giving a reduced clammy feeling to skin compared to that of smooth rubber.

Additives, such as thickeners, accelerators, curatives or curing agents can be used in the various embodiments of the textured surface coatings of the present invention. Useful thickeners include, but are not limited to, ammonium polyacrylate, methylcellulose, and polyvinyl alcohol. Useful accelerators include, but are not limited to, zinc diethyldithiocarbamate ("ZDEC"), zinc dibutyldithiocarbamate ("ZDBC"), zinc dimethyldithiocarbamate ("ZDMC"), zinc butyl ethyl dithiocarbamate ("ZBED"), zinc mercaptobenzthiazole ("ZMBT"), mercaptobenzthiazole ("MBT"), and diphenylguanidine ("DPG"). Other useful curatives and additives include, for example, sulphur and zinc oxide. Foaming and frothing agents are useful in the various embodiments of the textured surface coatings of the present invention. Traditional processing aids to aid gel formation and control webbing may be used. Other useful commercial additives include aqueous ammonia, wetting agents, surfactants, and antiwebbing agents. One useful wetting agent is TRITON X-100, available from Union Carbide Ltd., U.S.A. One useful antiwebbing agent is DEFOAMER 1512M, available from Hercules Ltd., Wilmington, Del.

In the latex art, quantities of components are expressed in terms of parts by weight per hundred parts by weight rubber ("phr"). In the embodiments of the present invention, accelerators can be used in the range of between about 0.5 phr to about 1.5 phr individually, or in combination where the sum of the parts preferably should not exceed that range. A preferred embodiment will now be further described in the following example.

EXAMPLE 1

Step 1. The following Coagulant Solution is Prepared

| Calcium nitrate, aq. concentration | 35% by volume |
|---|---|
| TRITON X 100 | about 0.1% by volume |
| DEFOAMER 1512M | about 0.5% by volume |

The coagulant solution is heated to 30 to 40° C. A clean porcelain glove former is evenly coated over its surface by immersion in the coagulant solution. The speed of immersion is approx. 1.5 cm/sec, the dwell time is 5 to 10 sec, and the extraction speed is approx. 0.75 cm/sec.

Step 2. The coagulant coated former is inverted to fingers up position and dried in a warm gentle air flow (30 to 40° C.) for 2 to 2.5 minutes.

Step 3. The dried coagulant coated former is reinverted to fingers down position and dipped into a nitrile latex compound:

| REVENEX 99G43 | 100 phr |
|---|---|
| Sulphur | 0.5 phr |
| Zinc Oxide | 3.0 phr |
| ZMBT | 0.7 phr |

The pH is adjusted to 9.0 (with ammonia or potassium hydroxide). The viscosity of the latex is typically 20 to 40 cps (Brookfield viscometer model DV1+, spindle #2@30 rpm). The latex is held at 20 to 25° C. The speed of immersion is approx. 1.5 cm/sec, the dwell time in the latex is 30 to 90 sec, depending on desired wall thickness, and the extraction speed is approx. 1.2 cm/sec.

Step 4. The gelled nitrile latex coated former is inverted to fingers up position to aid dispersal of finger tip drips, dwell time minimum 30 sec at ambient air temperature.

Step 5. The gelled nitrile latex coated former (now a nitrile glove shell) is reinverted to fingers down position and dipped into water heated to 40 to 60° C. to remove residual surface syneresis products, dwell time 60 to 80 sec.

Step 6. The nitrile glove shell is inverted to the fingers up position to aid dispersal of the finger drips and then partially dried to remove excess water on the gel surface and finger tips.

Step 7. The nitrile glove shell is inverted to fingers down position and overdipped to the wrist (or alternatively completely to the cuff) with a second layer of a nitrile latex as follows:

| REVENEX 99G43 | 100 phr |
|---|---|
| Sulphur | 0.5 phr |
| Zinc Oxide | 3.0 phr |
| ZMBT | 0.7 phr |

The pH of this latex has been adjusted to 9.0 (with ammonia or potassium hydroxide), and the viscosity of the latex has been adjusted to 500 cps (Brookfield viscometer model DV1+, spindle #2@30 rpm) using ammonium polyacrylate. The latex is held at 20 to 25° C. The speed of immersion is approx. 1 to 3 cm/sec, the dwell time in the latex is approx. 10 to 30 sec, and the extraction speed is approx. 2 cm/sec.

Step 8. The nitrile glove shell, now having a liquid second layer of nitrile latex overdip is inverted to fingers up position to disperse finger drips and then quickly reinverted back to fingers down position. Particles of sodium chloride (99% purity, mean particle size 400 microns) are applied to the second layer of latex in a fluidized bed apparatus, available from Campbell Coutts Ltd., Southampton, England. The glove shell is held at ambient temperature. The speed of immersion into the fluidized bed is approx. 2 cm/sec, the dwell time in the fluidized bed is 5 to 10 sec, and the extraction speed is approx. 2 cm/sec. In a variant of step 8, during the dwell time the fluidized bed may be turned off so as to achieve a sharper/deeper impression into the latex layer. During the extraction of the former the fluidized bed is turned back on.

Step 9. The salt coated shell is washed with water at ambient temperature to remove sodium chloride remaining at the now gelled surface.

Step 10. The gelled glove product is then leached in warm water at approx. 40° C. for approx. 15 minutes.

Step 11. The gelled glove product is dried and vulcanised in a conventional recirculating hot air oven at 130° C. for approx. 60 minutes.

Step 12. The cured glove is allowed to cool and is then reversed stripped off the former. In a variant of step 12, an internal lining (e.g. cotton flocking) may be attached.

Step 13. The finished, cured glove is then turned inside out so that the textured surface is on the outside of the glove.

A pinch force test was developed to measure the grip force required to lift a steel weight having a polished surface and covered with a mixture of hydraulic oil and grease. Several gloves were tested, including a glove prepared according to Example 1 ("Textured Glove"), and known nitrile gloves of similar formulation, yet not having a textured surface coating, namely Ansell SOLVEX 37-676 and Ansell SOLKNIT 39-122.

The test apparatus employed a model PPS-6 Kg mass balance available from Applied Instruments Ltd., United Kingdom, modified with a stainless steel strip attached to its underside, directly opposite the flat stainless steel load pan of the balance. The entire apparatus is turned on its side for the test, in such a manner that it can be gripped by a gloved hand against the force of gravity while pointed toward the floor. The stainless steel surfaces were coated with mixture of hydraulic oil and grease for the following testing. The pinch force test was carried out as follows.

1. The test glove is donned by a volunteer tester.
2. The tester grips the apparatus at right angles to the surfaces using the thumb and the first finger (or second finger) only, one digit on each opposing surface at aprrox. 4 cm along the surface toward the floor, using only the last digit pads on finger and thumb as contact points.
3. The tester squeezes and attempts to lift the apparatus, then holds the apparatus with enough force to hold it motionless without slip.
4. The immediate grip force is recorded in mass units read off of the mass balance.
5. After the initial gripping and lifting, a steady grip force is recorded after approx. 5 to 10 seconds.
6. The grip is steadily loosened in order to allow the apparatus to slip from the grip.
7. The minimal grip force is recorded at the point of slip.
8. Additional weights are subsequently added to the apparatus and steps 1-7 repeated.

Our test data, shown in Table 1, demonstrates that the textured surface, when used as the surface of a nitrile glove (or any latex glove) as prepared in Example 1, and then used to handle wet or oily objects, provides exceptional user grip and control results.

TABLE 1

| Test Glove | Immediate Grip Force (kg) | Steady Grip Force (kg) | Minimal Grip Force (kg) | Observations |
|---|---|---|---|---|
| Weight to lift: First wt. = 1.9 kg* | | | | |
| Textured glove | 3.2 | 2.6 | 2.3 | Gentle slipping felt before final slip |
| Solvex 37-676 | 4.5 | 2.6 | 2.2 | No warning—violent final slip |
| Solknit 39-122 | 4.2 | 3.2 | 2.5 | Little or no warning before sudden slip |
| Weight to lift Second wt. = 2.7 kg** | | | | |
| Textured glove | 4.5 | 4.0 | 3.0 | Gentle slipping felt before final slip |
| Solvex 37-676 | 6.5 | 5.0 | 3.0 | No warning—violent final slip |
| Solknit 39-122 | 8.0 | 7.8 | No grip | No warning—violent final slip |
| Weight to lift Third wt. = 3.5 kg** | | | | |
| Textured glove | 6.8 | 6.8 | 6.8 | Able to lift, but gently slipping |
| Solvex 37-676 | No grip, could not lift | No grip | No grip | Could not lift |
| Solknit 39-122 | No grip, could not lift | No grip | No grip | Could not lift |

*Represents the approximate weight of the apparatus.
**Cumulative weight.

As shown in Table 1, the textured glove made according to Example 1 exhibits improved grip control and confidence when slip occurs. When compared to conventional nitrile gloves, the textured glove requires the lowest grip force to lift the three weights defined by the apparatus. The textured glove required 29% and 31% less immediate grip force to lift the first weight and second weight, respectively, compared to the SOLVEX 37-676 glove; and required 20% less steady grip force to hold the second weight compared to the SOLVEX 37-676 glove. The textured glove required 24% and 44% less immediate grip force to lift the first weight and second weight, respectively, compared to the SOLKNIT 39-122 glove; and required 19% and 49% less steady grip force to hold the first weight and second weight, respectively, compared to the SOLKNIT 39-122 glove. It is notable that sudden, violent slip can occur using conventional gloves. In contrast, the textured glove provides control of slip even when slip occurred.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

While the invention has been described in conjunction with specific embodiments thereof, it is evident that alternatives, modifications and variations will be apparent to those skilled in the art in light of the foregoing description. It should be understood that the illustrated embodiments are exemplary only, and should not be taken as limiting the scope of the invention. Accordingly, it is intended to embrace all such alternatives, modifications and variations as fall within the spirit and broad scope of the appended claims.

What is claimed is:

1. A process for making a cured textured glove, the process comprising:
   providing a support layer of a dip-coated, gelled latex or of a non-latex material on a former;
   dip-coating the former with the support layer in a coagulatable aqueous latex emulsion composition to form an ungelled outer layer of emulsion composition;
   applying discrete particles of multi-faceted salt to the ungelled outer layer of emulsion composition;
   coagulating the ungelled outer layer of emulsion composition where the particles of multifaceted salt are in contact with the ungelled outer layer of emulsion composition to form a gelled outer layer so that impressions replicating the multi-faceted shape of the particles of salt are formed in the gelled outer layer;
   dissolving the particles of multi-faceted salt;
   heat curing the gelled outer layer after the step of dissolving to form a cured outer layer; and
   stripping the support layer and the cured outer layer from the former to form the cured textured glove comprising the impressions replicating the multi-faceted shape of the particles of salt.

2. The process of claim 1, wherein the step of providing the support layer comprises treating the former with a coagulant; forming the support layer of latex by dip-coating the former in a coagulatable aqueous latex emulsion composition; and gelling the first layer of latex by the destabilization of the latex emulsion by said coagulant.

3. The process of claim 1, wherein the step of providing the support layer comprises applying a woven or knitted layer of non-latex material to the former.

4. The process of claim 3, further comprising forming an inner layer of gelled latex between the support layer of non-latex material and the ungelled outer layer.

5. The process of claim 1, wherein the step of forming the ungelled outer layer comprises using a foamed latex emulsion.

6. The process of claim 1, wherein the support layer of the dip-coated, gelled latex, the coagulatable aqueous latex emulsion composition, or both comprises a natural latex, a polyurethane latex, a nitrile latex, or a polychloroprene latex.

7. The process of claim 1, wherein the discrete particles are sized in the range of 50 to 2000 microns.

8. The process of claim 7, wherein a mean particle size is 400 microns.

9. The process of claim 1, wherein the step of applying discrete particles of multi-faceted salt to the ungelled outer layer comprises dipping the former in a fluidized bed of salt.

10. The process of claim 1, wherein the step of applying discrete particles of multi-faceted salt to the ungelled outer layer comprises spraying the particles onto the outer layer of latex.

11. The process of claim 1, wherein the discrete particles of salt comprise sodium chloride, potassium chloride, calcium chloride, magnesium chloride, zinc chloride, calcium nitrate, or zinc nitrate.

12. The process of claim 1, wherein the particles of multi-faceted salt are dissolved in water.

13. A process for making a cured textured glove, the process comprising:
    treating a former with a coagulant;
    dip-coating the former in a coagulatable aqueous latex emulsion composition to form a gelled support layer of latex;
    washing the gelled support layer of latex to remove residual surface syneresis products;
    drying the gelled support layer to remove excess water on the gelled support layer;
    dip-coating the former with the gelled support layer in a coagulatable aqueous latex emulsion composition to form an ungelled outer layer of emulsion composition;
    applying discrete particles of multi-faceted salt to the ungelled outer layer of emulsion composition;
    coagulating the ungelled outer layer of emulsion composition where the particles of multifaceted salt are in contact with the ungelled outer layer of emulsion composition to form a gelled outer layer so that impressions replicating the multi-faceted shape of the particles of salt are formed in the gelled outer layer;
    dissolving the particles of multi-faceted salt;
    heat curing the gelled outer layer after the step of dissolving to form a cured outer layer; and
    stripping the support layer and the cured outer layer from the former to form the cured textured glove comprising the impressions replicating the multi-faceted shape of the particles of salt.

14. The process of claim 13, wherein the coagulatable aqueous latex emulsion is coagulatable by sodium chloride.

15. The process of claim 13, wherein the coagulatable aqueous latex emulsion composition for the gelled support layer of latex has a first viscosity and the coagulatable aqueous latex emulsion composition for the ungelled outer layer has a second viscosity.

16. The process of claim 15, wherein the first viscosity is in the range of 20 to 40 cps and the second viscosity is in the range of 100 to 2000 cps.

17. The process of claim 13, wherein the particles of multi-faceted salt are dissolved in water.

18. The process of claim 13, further comprising providing a knitted liner on the former before treating the former with the coagulant.

* * * * *